(12) United States Patent
Martin et al.

(10) Patent No.: US 9,153,144 B2
(45) Date of Patent: Oct. 6, 2015

(54) RAPID APPROACH DETECTOR

(71) Applicant: Ford Global Technologies, LLC, Dearborn, MI (US)

(72) Inventors: Douglas Raymond Martin, Canton, MI (US); Kenneth James Miller, Canton, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 186 days.

(21) Appl. No.: 13/959,057

(22) Filed: Aug. 5, 2013

(65) Prior Publication Data

US 2015/0037762 A1 Feb. 5, 2015

(51) Int. Cl.
*B60T 7/12* (2006.01)
*G09B 19/16* (2006.01)
*B60R 21/013* (2006.01)

(52) U.S. Cl.
CPC ............ *G09B 19/167* (2013.01); *B60R 21/013* (2013.01)

(58) Field of Classification Search
None
See application file for complete search history.

(56) References Cited

U.S. PATENT DOCUMENTS

| | | | |
|---|---|---|---|
| 8,463,521 B2 | 6/2013 | Westendorf | |
| 2003/0128107 A1 | 7/2003 | Wilkerson | |
| 2004/0153362 A1 | 8/2004 | Bauer et al. | |
| 2006/0100775 A1* | 5/2006 | Michi et al. | 701/200 |
| 2010/0205012 A1 | 8/2010 | McClellan | |
| 2011/0193693 A1 | 8/2011 | Filev et al. | |
| 2011/0264395 A1 | 10/2011 | Smith et al. | |
| 2012/0066007 A1 | 3/2012 | Ferrick et al. | |
| 2012/0095673 A1 | 4/2012 | Choi et al. | |
| 2013/0013348 A1 | 1/2013 | Ling et al. | |
| 2013/0060583 A1 | 3/2013 | Collins et al. | |
| 2013/0073114 A1* | 3/2013 | Nemat-Nasser et al. | 701/1 |
| 2013/0085668 A1 | 4/2013 | Roberts, Sr. et al. | |
| 2013/0191005 A1* | 7/2013 | Hrovat et al. | 701/102 |
| 2014/0293053 A1* | 10/2014 | Chuang | 348/148 |

OTHER PUBLICATIONS

Deloitte Insurance, Feb. 2012, Telematics White Paper, 12 pps.

* cited by examiner

*Primary Examiner* — Adam Alharbi
(74) *Attorney, Agent, or Firm* — Frank A. MacKenzie; Bejin Bieneman PLC

(57) ABSTRACT

A computer in a vehicle is configured to receive one or more data collector inputs, detect an object proximate to the vehicle based on the one or more inputs, determine a closure speed between the object and the vehicle, determine a change in speed of the object, compute an accountability factor; and determine whether to identify a potential incident based at least in part on the accountability factor and an incident value. The incident value is a function of at least one of the closure speed and a distance between the vehicle and the object. The accountability factor is based at least in part on the closure speed and the change in speed of the object.

20 Claims, 3 Drawing Sheets

RAPID APPROACH DETECTOR

BACKGROUND

A vehicle collision or vehicle crash incident may be more likely when a first vehicle approaches a second vehicle at a rapid rate of speed. However, a vehicle operator may not know that a rate of approach speed was dangerous, and/or the vehicle operator may ignore dangerous rapid approaches. In some cases, a vehicle operator may contribute to a potential or actual incident such as a collision by driving behavior, but in other cases another vehicle's operation, e.g., sudden braking, may be the sole or primary contributor to an incident. Unfortunately, mechanisms are presently lacking for identifying rapid approaches that may compromise vehicle safety and/or that may affect vehicle insurance rates, and for determining vehicle operator accountability for rapid approach incidents.

DRAWINGS

DETAILED DESCRIPTION

System Overview

Figure 1:
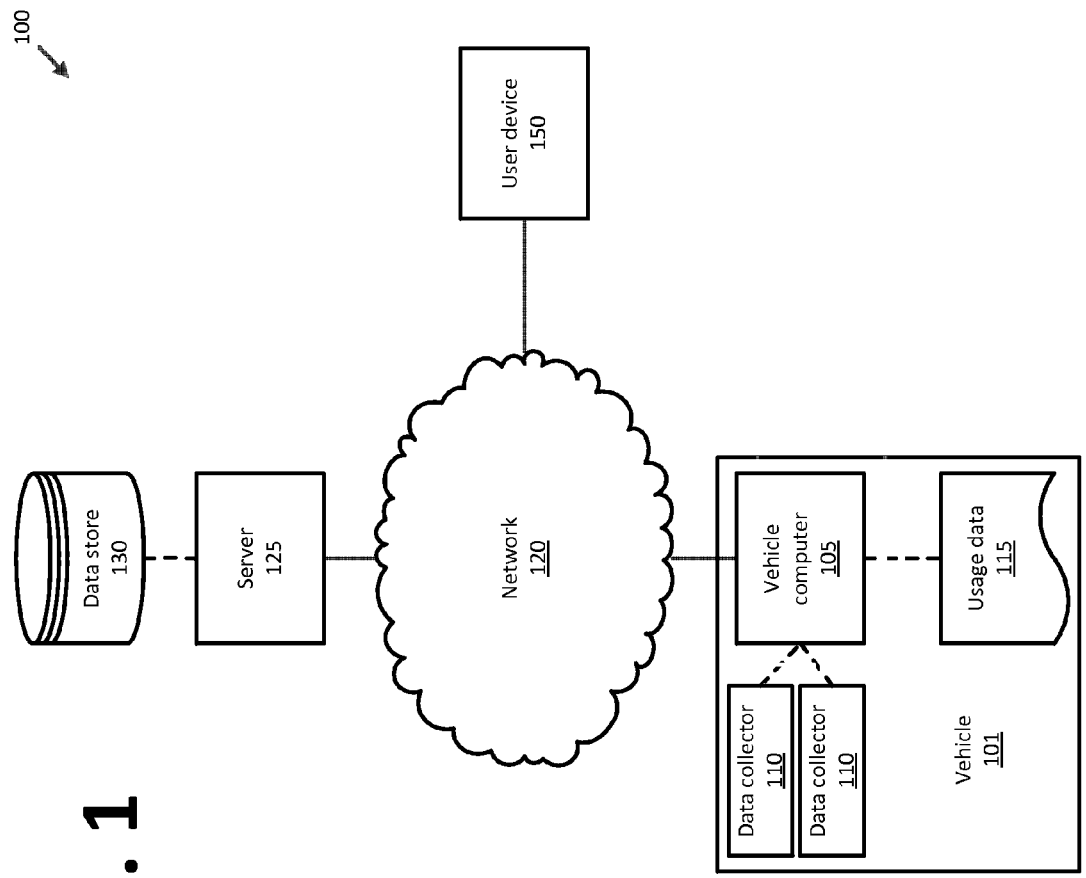
FIG. 1 is a block diagram of an exemplary system for detecting rapid approach incidents.

FIG. 1 is a block diagram of an exemplary system 100 for detecting rapid approach incidents. A vehicle 101 includes a vehicle computer 105 that is configured to receive information, e.g., usage data 115, from one or more data collectors 110 concerning various metrics of the vehicle 101 relevant to an approach of the vehicle 101 to one or more other vehicles, stationary objects, etc. For example, such metrics may include a speed (i.e., velocity) of the vehicle 101, a distance of the vehicle 101 from one or more other objects such as vehicles, stationary objects, etc. The computer 105 may also include instructions for identifying a potential collision incident, which may be reported to a server 125 via a network 120, and stored in a data store 130. Further, information related to a potential collision incident may be displayed on a display of the vehicle computer 105, a user device 150, or some other client device.

Figure 2:
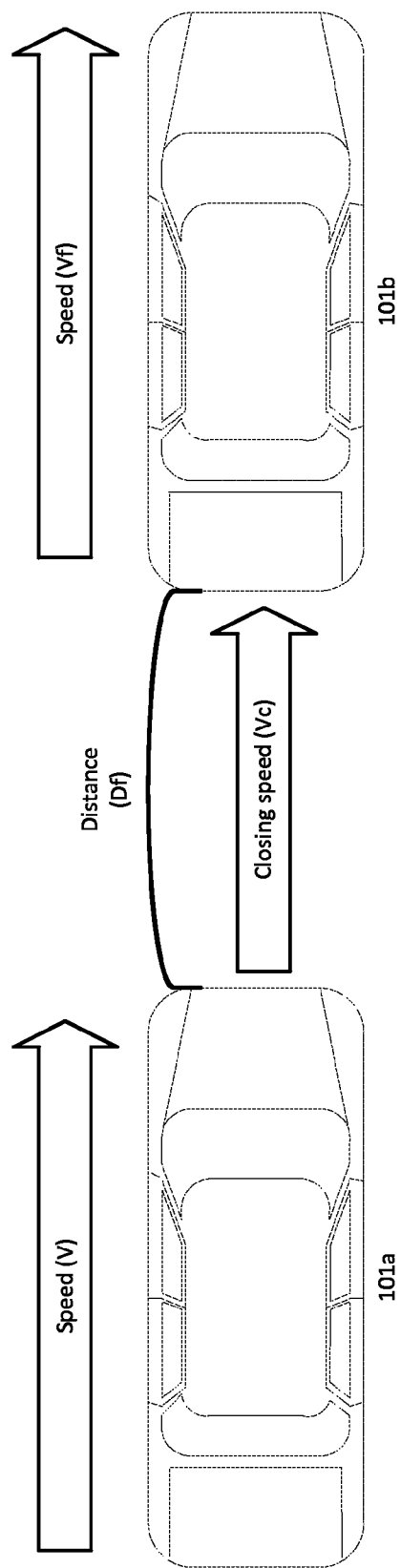
FIG. 2 is a block diagram illustrating a first vehicle rapidly approaching a second vehicle.

FIG. 2 is a block diagram illustrating a first vehicle 101a approaching a second vehicle 101b. As illustrated in FIG. 2, the first vehicle 101a may be traveling at a first speed (denoted by V), while the second vehicle may be traveling at a second speed (denoted by Vf). A distance (denoted Df) from the first vehicle 101a to the second vehicle 101b, which is in this example in front of the first vehicle 101a, may be measured by one or more data collectors 110, as discussed below. Based on the two vehicles' respective velocities and the distance Df, a closing speed Vc, i.e., a rate of speed at which the vehicles 101 are approaching one another, may be calculated. The closing speed Vc and other factors as discussed below may be used to determine whether a potential incident, e.g. a potential collision incident, should be identified.

Exemplary System Elements

A vehicle 101 includes a vehicle computer 105 that generally includes a processor and a memory, the memory including one or more forms of computer-readable media, and storing instructions executable by the processor for performing various operations, including as disclosed herein. The memory of the computer 105 further generally stores usage data 115. The computer 105 is generally configured for communications on a controller area network (CAN) bus or the like. The computer 105 may also have a connection to an onboard diagnostics connector (OBD-II). Via the CAN bus, OBD-II, and/or other wired or wireless mechanisms, the computer 105 may transmit messages to various devices in a vehicle and/or receive messages from the various devices, e.g., controllers, actuators, sensors, etc., including data collectors 110. In addition, the computer 105 may be configured for communicating with the network 120, which, as described below, may include various wired and/or wireless networking technologies, e.g., cellular, Bluetooth, wired and/or wireless packet networks, etc.

Data collectors 110 may include a variety of devices. For example, various controllers in a vehicle may operate as data collectors 110 to provide data 115 via the CAN bus, e.g., data 115 relating to vehicle speed, acceleration, etc. Further, sensors or the like, global positioning system (GPS) equipment, etc., could be included in a vehicle and configured as data collectors 110 to provide data directly to the computer 105, e.g., via a wired or wireless connection. Sensor data collectors 110 could include mechanisms such as RADAR, LADAR, sonar, etc. sensors that could be deployed to measure the distance Df between the vehicle 101 and second vehicle 101, stationary object, etc.

Usage data 115 may include a variety of data collected in one or more vehicles based on operations by a particular consumer, i.e., vehicle user, i.e. Data 115 is generally collected using one or more data collectors 110, and may additionally include data calculated therefrom in the computer 105, and/or at the server 125. In general, usage data 115 may include any data that may be gathered by a collection device 110 and/or computed from such data, and that may be relevant to vehicle powertrain usage. For example, usage data 115 may include vehicle speed, vehicle acceleration, a distance from another vehicle 101, etc. In general, as noted below, a usage datum 115 is generally associated with a particular point in time.

The network 120 represents one or more mechanisms by which a vehicle computer 105 may communicate with a remote server 125. Accordingly, the network 120 may be one or more of various wired or wireless communication mechanisms, including any desired combination of wired (e.g., cable and fiber) and/or wireless (e.g., cellular, wireless, satellite, microwave, and radio frequency) communication mechanisms and any desired network topology (or topologies when multiple communication mechanisms are utilized). Exemplary communication networks include wireless communication networks (e.g., using Bluetooth, IEEE 802.11, etc.), local area networks (LAN) and/or wide area networks (WAN), including the Internet, providing data communication services.

The server 125 may be one or more computer servers, each generally including at least one processor and at least one memory, the memory storing instructions executable by the processor, including instructions for carrying out various of the steps and processes described herein. The server 125 may include or be communicatively coupled to a data store 130 for storing usage data 115, records relating to potential incidents generated as described herein, etc.

A user device 150 may be any one of a variety of computing devices including a processor and a memory, as well as communication capabilities. For example, the user device 155 may be a portable computer, tablet computer, a smart phone, etc. that includes capabilities for wireless communications using IEEE 802.11, Bluetooth, and/or cellular communications protocols. Further, the user device 155 may use such communications capabilities to communicate via the network 120 and also directly with a vehicle computer 105, e.g., using Bluetooth.

Exemplary Process Flows

Figure 3:
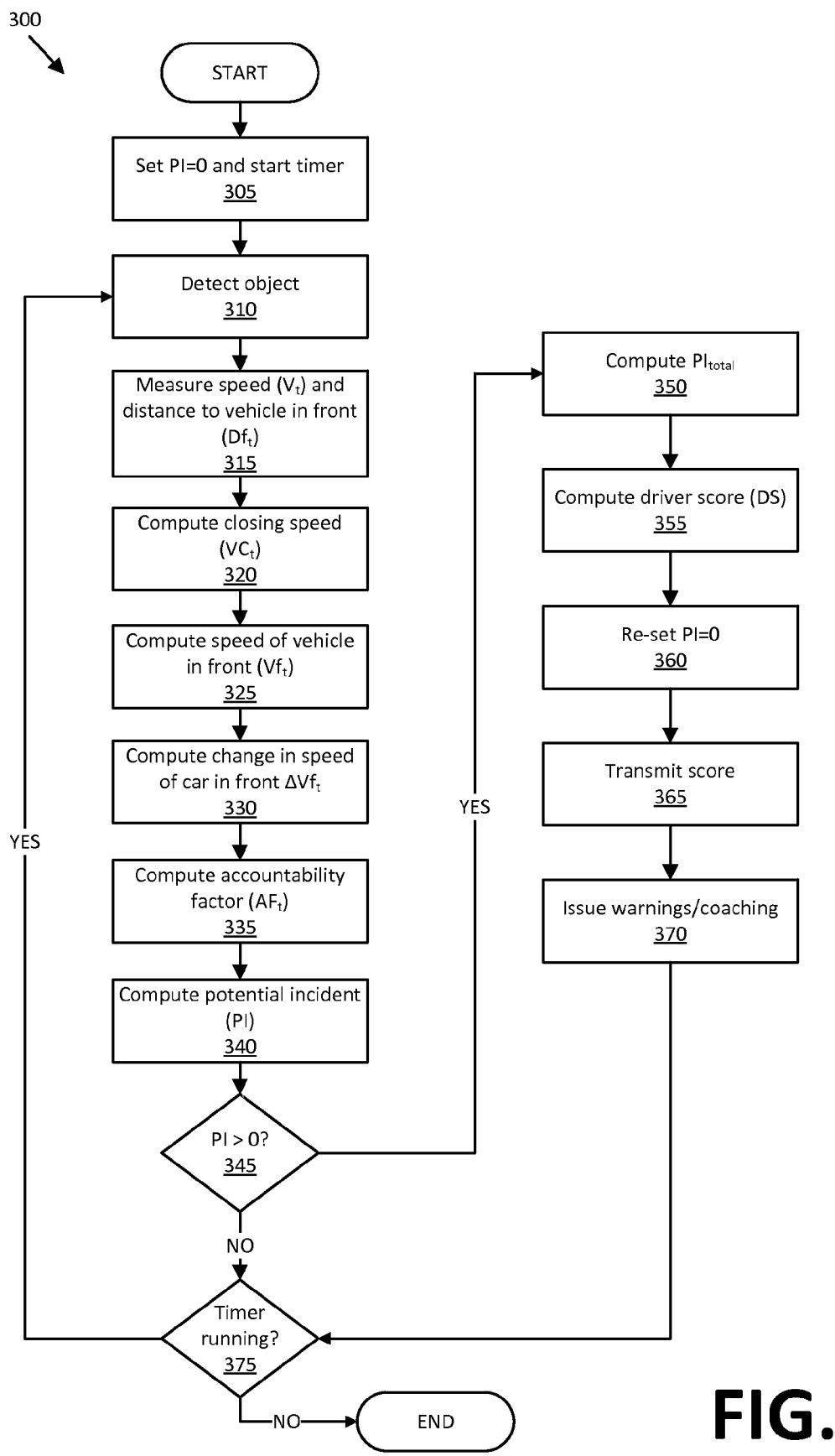
FIG. 3 is a diagram of an exemplary process for identifying and reporting rapid approach incidents.

FIG. 3 is a diagram of an exemplary process 300 for identifying and reporting rapid approach incidents.

The process 300 begins in a block 305, in which a "potential incident" variable PI is initialized to a value of zero, and a timer is started. Further, a variable $PI_{total}$, discussed further below, is also initialized to a value of zero. Generally, the process 300 begins, and the timer is started, when a driving session begins, e.g., when a vehicle 101 is started, whereupon the computer 105 is booted. Accordingly, the timer provides a count of time, e.g., provides a series of time indices, beginning with the start of a driving session.

Next, in a block 310, data collectors 110 provide data to the computer 105 indicating that an object has been detected proximate to the vehicle 101. For purposes of the block 310, "proximate" could be defined as a distance threshold, e.g., five feet, 10 feet, 50 feet, etc. In general, the other object may be another vehicle, but the other object could also be a stationary or slow-moving object such as a person, a building, a tree, fence, etc.

Next, in a block 315, the computer 105 obtains, e.g. via CAN bus communications or the like, a measurement of velocity of the vehicle 101 at a current time indicated by the timer ($V_t$). Further, the computer 105 obtains, e.g., from a data collector 110 such as a RADAR device, a LADAR device, etc., a measurement of distance (Df) between the vehicle 101 and the object detected in the block 310. Moreover, as will be seen below, e.g., with respect to the block 320, the computer 105 generally makes multiple measurements of the distance between the vehicle 101 in the object at different times, e.g., $Df_t$, $Df_{t-1}$, where $Df_t$ represents a current or most recent distance measurement, and $Df_{t-1}$ represents a previous distance measurement. For example, the difference between a times t and t−1 may be 1 second.

Next, in a block 320, the computer 105 computes a closure velocity (VC) between the vehicle 101 and the object. For example, the closure velocity at a time t could be computed according to the formula:

$$VC_t = (Df_t - Df_{t-1})/[t-(t-1)].$$

Thus, if $Df_t$ was 100 feet, and $Df_{t-1}$ was 99 feet, and the difference between t and t−1 was one second, then the closure speed or velocity VC would be one foot per second, or 0.68 miles per hour (m.p.h.).

Next, in a block 325, the computer 105 computes a velocity (Vf) of the object, e.g., another vehicle that is in front of the vehicle 101. The velocity Vf may be computed by adding the velocity of the vehicle 101 to the closure velocity, e.g., according to the formula:

$$Vf_t = V_t + VC_t.$$

Next, in a block 330, the computer 105 determines a rate of change of speed $\Delta Vf_t$, i.e., acceleration or deceleration, of the object. As discussed further elsewhere herein, e.g., with respect to the block 335, computing the rate of change of speed of the other vehicle or object, in addition to the closure velocity and the velocity of the vehicle 101 can be important in determining whether a potential incident should be identified. For example, a car may stop very suddenly in front of a vehicle 101, i.e., the rate of change of speed of the front car may be a rapid deceleration, in which case an operator of the vehicle 101 may be relatively blameless for a collision or potential collision. A value for the object's rate of change of speed may be computed according to the formula:

$$\Delta Vf_t = Vf_t - Vf_{t-1}.$$

Of course, this value could be zero, e.g., if the object is a stationary object or a vehicle is not changing speed.

Next, in a block 335, the computer 105 computes an accountability factor (AF), which is a value reflecting a degree to which a vehicle 101 operator should be held accountable for a potential incident, as opposed to a degree to which the behavior of the object, e.g., another vehicle, being approached, is responsible for the potential incident, e.g., because of rapid braking, rapid reverse, etc. In one implementation, the accountability factor AF includes two components, or sub-factors: AF1, which is a function of the object's velocity $Vf_t$, and AF2, which is a function of the object's change of rate of speed $\Delta Vf_t$. Examples of the functions for AF1 and AF2 include, where the functions may further provide that values for $Vf_t$, and $\Delta Vf_t$ below certain respective thresholds, e.g., ←15 m.p.h., or $\Delta Vf_t$←10 miles per hour per second, respectively result in values of zero for AF1 and AF2. The accountability factor AF may then be computed based on values of its components, e.g., as a simple product according to the formula:

$$AF = AF1 * AF2.$$

In general, an accountability factor may be the product of two or more accountability sub-factors AF1*AF2* ... AFn. A first accountability sub-factor, AF1, may be a function on the speed that the object, e.g., a vehicle in front of the vehicle 101, is going in reverse (e.g., a vehicle in front going −15 m.p.h. in reverse removes accountability, i.e., AF1=0). As another example, the value of AF1 could be 1.0 where the object, e.g., another vehicle, was not moving. Yet another example may have AF1 at a value of 0.5 if the vehicle in front was moving in reverse at 5 m.p.h. Further for example, as shown in Table 1, an accountability factor AF1 could be a function of the velocity of the object, e.g., vehicle in front:

TABLE 1

| Vf (in m.p.h.) | 0 | −2.5 | −5 | −10 | −15 |
|---|---|---|---|---|---|
| AF1 | 1 | 0.75 | 0.5 | 0.25 | 0 |

A second exemplary accountability factor, AF2, could be a function on the deceleration rate of the object, e.g., a vehicle in front decreasing speed by 10 m.p.h. within 1 second could remove accountability, i.e., AF2=0. As another example, the values of AF1 and AF2 could each be 1.0 where the object, e.g., other vehicle, was not moving. Yet another example may have AF2 at a value of 0.5 if the vehicle in front was decelerating by 5 m.p.h. within 1 second. Further for example, as shown in Table 2, an accountability factor AF2 could be a function of the rate of change in velocity of the object, e.g., vehicle in front:

TABLE 2

| ΔVf (m.p.h./per sec.) | 0 | −5 | −10 | −15 | −20 |
|---|---|---|---|---|---|
| AF2 | 1 | 0.75 | 0.5 | 0.25 | 0 |

Other accountability factors (AF3 ... AFn) are also possible, and could be based on factors such as a vehicle that unexpectedly enters the lane of the vehicle 101, detected road obstacles, etc.

Next, following the block 335, in a block 340, the computer 105 computes a potential incident (PI) value related to the time t. For example, the PI value could be computed according to logic that maintains the PI value at zero unless the closure speed $VC_t$ exceeded a certain threshold, e.g., 20 miles per hour, and the distance Df between the vehicle 101 and the object fell below a certain threshold e.g., 100 feet. In one implementation, PI could be computed according to the product of the accountability factor (AF) and an incident value (IV), e.g., according to the formula:

$$PI = AF*IV.$$

The incident value (IV) is generally a function on the closure speed (CS) and the distance to the object (Df). For example, Table 3 provides values that could be provided for such a function:

TABLE 3

|  |  | Closing Speed CS (m.p.h.) | | | | | |
|---|---|---|---|---|---|---|---|
|  |  | 0 | 2.5 | 5 | 10 | 20 | 30 |
| Df (ft.) | 100 | 0 | 0 | 0 | 0 | 0 | 0 |
|  | 75 | 0 | 0 | 0 | 0 | 0.25 | 0.5 |
|  | 50 | 0 | 0 | 0 | 0.5 | 0.5 | 1 |
|  | 25 | 0 | 0 | 0 | 0.25 | 1 | 1 |
|  | 0 | 0 | 0 | 0.5 | 1 | 1 | 1 |

Next, in a block 345, the computer 105 determines whether the potential incident value PI is greater than zero. If yes, a block 350 is executed next. Otherwise, the process 300 proceeds to a block 375.

In the block 350, the computer 105 computes a total potential incident value $PI_{total}$, generally according to the formula:

$$PI_{total} = PI_{total} + PT.$$

Following the block 350, next, in a block 355, the computer 105 computes a driver score DS for an operator of the vehicle 101. In general, a driver score is an indicator of an average driving time between potential incidents. Accordingly, where a total drive time for a driving session, e.g., the time (T) elapsed on the timer initiated in the block 305, a formula for a driver score DS may be:

$$DS = T/PI_{total}.$$

Next, in a block 360, the variable PI is re-set to zero.

Next, in a block 365, the value for the driver score DS is transmitted to the server 125. Further, other usage data 115 may be transmitted to the server 125 as a record of an operator's driving habits, e.g., average speeds, distances traveled, instances of acceleration or deceleration exceeding a certain threshold, etc.

Next, in a block 370, the computer 105 may provide a warning or notification to an operator of the vehicle 101, e.g., via a display in the vehicle 101 connected to the computer 105, via a user device 150, via a messaging mechanism such as email or short message service (SMS) messaging, etc. In any case, such warning, message, or notification may reflect the value of the driver score. For example for a driver score that is poor, e.g., where DS<1, a message could provide a notification such as "Poor driver score. You could improve your score if you more closely match the speed of the car in front of you," or "Poor driver score. You could save money on insurance if you more closely match or speed to that of the car in front of you." Similarly, a notification could be provided advising of a good driver score.

Following either the block 370 or the block 345, the block 375 may be executed. In the block 375, the computer 105 determines whether the timer initiated in the block 305 continues to run, that is whether a driving session continues. If it does not, or, alternatively, if a vehicle 101, including the computer 105, is powered off, the process 300 ends. Otherwise, the process 300 returns to the block 310.

CONCLUSION

Computing devices such as those discussed herein generally each include instructions executable by one or more computing devices such as those identified above, and for carrying out blocks or steps of processes described above. For example, process blocks discussed above may be embodied as computer-executable instructions.

Computer-executable instructions may be compiled or interpreted from computer programs created using a variety of programming languages and/or technologies, including, without limitation, and either alone or in combination, Java™, C, C++, Visual Basic, Java Script, Perl, HTML, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media. A file in a computing device is generally a collection of data stored on a computer readable medium, such as a storage medium, a random access memory, etc.

A computer-readable medium includes any medium that participates in providing data (e.g., instructions), which may be read by a computer. Such a medium may take many forms, including, but not limited to, non-volatile media, volatile media, etc. Non-volatile media include, for example, optical or magnetic disks and other persistent memory. Volatile media include dynamic random access memory (DRAM), which typically constitutes a main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

In the drawings, the same reference numbers indicate the same elements. Further, some or all of these elements could be changed. With regard to the media, processes, systems, methods, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

Accordingly, it is to be understood that the above description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their broadest reasonable constructions and their ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

The invention claimed is:

1. A system, comprising a computer in a vehicle, the computer comprising a processor and a memory, wherein the computer is configured to:
   receive one or more data collector inputs;
   detect an object proximate to the vehicle based on the one or more data collector inputs;
   determine a closure speed between the object and the vehicle;
   determine a change in speed of the object;
   compute an accountability factor based at least in part on the closure speed and the change in speed of the object; and
   determine whether to identify a potential incident based at least in part on the accountability factor and an incident value that is a function of at least one of the closure speed and a distance between the vehicle and the object.

2. The system of claim 1, wherein the computer is further configured to compute a driver score based on the accountability factor and a value assigned to the potential incident.

3. The system of claim 2, wherein the computer is further configured to transmit the driver score to a remote server.

4. The system of claim 2, wherein the computer is further configured to display a message based on the driver score.

5. The system of claim 1, wherein the accountability factor is the product of two or more accountability sub-factors.

6. The system of claim 5, wherein at least one accountability sub-factor is a function of a reverse speed of the object.

7. The system of claim 5, wherein at least one accountability sub-factor is a function of a deceleration rate of the object.

8. The system of claim 1, wherein the computer is further configured to:
   determine a speed of the object and a distance of the object based on the one or more data collector inputs; and
   use the speed of the object and the distance of the object in determining the closure speed.

9. The system of claim 1, wherein the incident value depends on both of the distance between the vehicle and the object and the closure speed.

10. A method, comprising:
    receiving one or more data collector inputs;
    detecting an object proximate to the vehicle based on the one or more data collector inputs;
    determining a closure speed between the object and the vehicle;
    determining a change in speed of the object;
    computing an accountability factor based at least in part on the closure speed and the change in speed of the object; and
    determining whether to identify a potential incident based at least in part on the accountability factor and an incident value that is a function of at least one of the closure speed and a distance between the vehicle and the object.

11. The method of claim 10, further comprising computing a driver score based on the accountability factor and a value assigned to the potential incident.

12. The method of claim 11, wherein the computer is further configured to transmit the driver score to a remote server.

13. The method of claim 11, wherein the computer is further configured to display a message based on the driver score.

14. The method of claim 10, wherein the accountability factor is the product of two or more accountability sub-factors.

15. The method of claim 14, wherein at least one accountability sub-factor is a function of a reverse speed of the object.

16. The method of claim 14, wherein at least one accountability sub-factor is a function of a deceleration rate of the object.

17. The method of claim 10, wherein the computer is further configured to:
    determine a speed of the object and a distance of the object based on the one or more data collector inputs; and
    use the speed of the object and the distance of the object in determining the closure speed.

18. The method of claim 10, wherein the incident value depends on both of the distance between the vehicle and the object and the closure speed.

19. A system, comprising a computer comprising a processor and a memory, wherein the computer is configured to:
    receive, via network, from a remote in-vehicle computer, a driver score based on an accountability factor and a value assigned to a potential incident;
    send the driver score to a third computer via the network;
    receive, from the third computer, information based on the driver score; and
    send transmit, via the network, a message to the in-vehicle computer based on the information based on the driver score;
    wherein:
    the accountability factor is based at least in part on a closure speed between the vehicle and an object and a change in speed of the object; and
    the value assigned to the potential incident based at least in part on the accountability factor and an incident value that is a function of at least one of the closure speed and a distance between the vehicle and the object.

20. The system of claim 19, wherein the wherein the accountability factor is the product of two or more accountability sub-factors.

* * * * *